Patented May 31, 1932

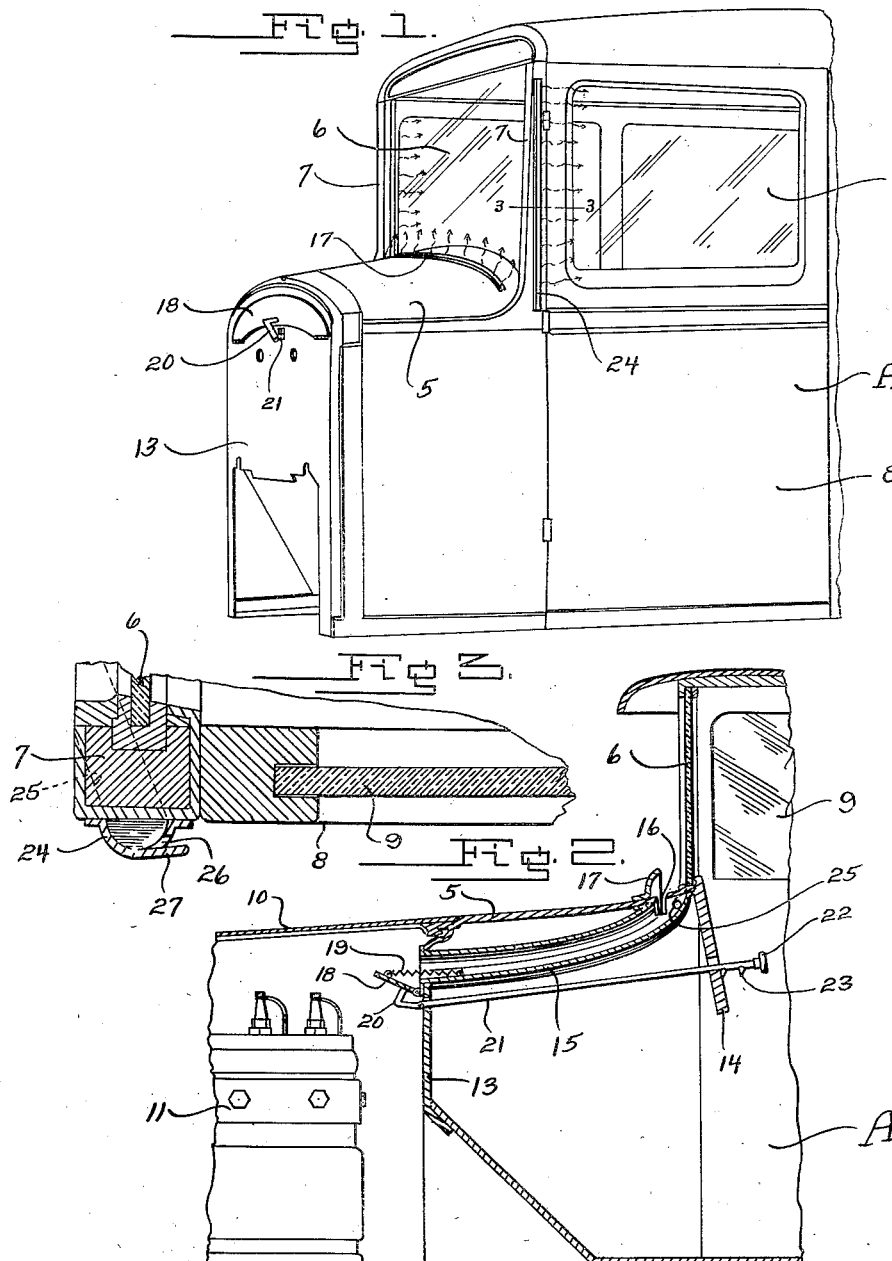

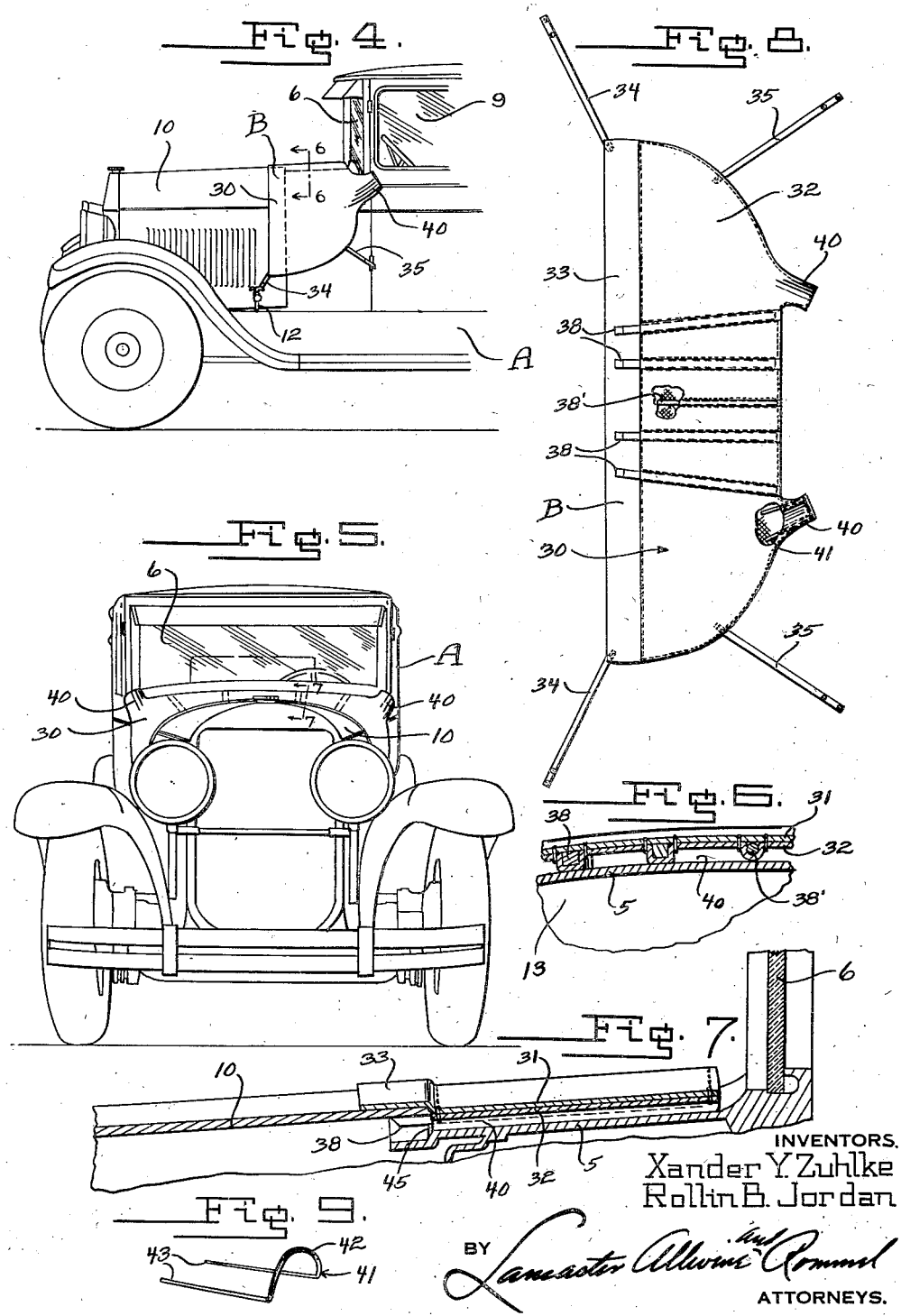

1,861,333

UNITED STATES PATENT OFFICE

XANDER Y. ZUHLKE AND ROLLIN B. JORDAN, OF BANCROFT, NEBRASKA

WINDOW HEATER FOR AUTOMOBILES

Application filed March 19, 1930. Serial No. 437,127.

The present invention relates to heaters for motor vehicles and more specifically to a device for directing warm air upon the windshield and glass panels of the side doors of the vehicle for keeping them free from snow, sleet, and ice and thus allowing the operator to have a clear vision both forwardly and to each side of the vehicle.

A further object of the invention is to provide a heater adapted to be associated with the cowl portion of the vehicle for conducting warm air from the motor and directing the warm air upon the windshield and also upon the glass panels of the side doors.

A further object resides in the novel arrangement whereby the device may be incorporated as a part of the vehicle body during construction or may be readily applied to vehicles now in use.

A still further object is to provide a device of this character which will not materially detract from the general appearance of the vehicle.

Other objects and advantages of the invention will be apparent during the course of the following detailed description, taken in connection with the accompanying drawings forming a part of this specification and in which drawings:

Figure 1 is a fragmentary perspective view of the forward portion of a motor vehicle body and showing the improved heater applied and incorporated as a part of the vehicle body construction.

Figure 2 is a detail sectional view showing the heater in section and showing the arrangement of the heater beneath the cowl.

Figure 3 is an enlarged fragmentary detail section on the line 3—3 of Figure 1.

Figure 4 is a fragmentary side elevation of a motor vehicle and showing a modified form of heater for attachment to existing types of motor vehicles.

Figure 5 is a front elevation of a motor vehicle showing the detachable heater applied.

Figure 6 is an enlarged fragmentary section substantially on the line 6—6 of Figure 4.

Figure 7 is an enlarged fragmentary detail section on line 7—7 of Figure 5.

Figure 8 is a plan view of the under side of the detachable type of heater.

Figure 9 is a perspective view of one of the supporting frames for the horns of the detachable type of heater.

In the drawings, and wherein similar reference characters designate corresponding parts thruout the several views, the letter A may designate a conventional type of vehicle body with which the improved heater has been shown associated for directing warm air currents from the motor to both the windshield panel and the glass panels of the side doors.

The vehicle body A embodies the usual cowl 5 across the rear of which is arranged the glass windshield panel 6 arranged between the two front corner posts or pillars 7. Arranged at each side of the vehicle body are the doors 8 provided with the usual glass panels 9 thru which the driver has vision to opposite sides of the vehicle. Forwardly of the cowl 5 is the usual hood 10 arranged over the internal combustion engine 11 serving as propelling means for the vehicle. The hood is retained in position by the usual fasteners 12. Extending downwardly from the forward edge of the cowl 5 is the usual dash 13 forming a partition between the engine 11 and the driver's compartment. Beneath the windshield panel 6 is the usual instrument board 14.

Referring particularly to Figures 1, 2 and 3, the improved heating device has been shown incorporated as a part of the body construction and embodies a substantially flat heating flue 15 arranged beneath the cowl 5 with its forward end extending thru and secured to the dash 13 so that the forward open end of the flue opens into the engine compartment beneath the hood 10. The rear end of the heating flue 15 is upturned and opens thru an elongated slot 16 formed across the rear portion of the cowl 5 directly forwardly of the lower end of the windshield panel 6. Secured to the upper side of the cowl 5 along the forward edge of the slot 16 is a deflector strip 17 for directing warm air currents passing upwardly thru the slot, rearwardly upon the face of the windshield panel 6. This deflector strip 17 is arcuate shape in formation and acts to positively direct the warm air currents rearwardly upon the face of the windshield panel for keeping the same free from snow, sleet or ice which may adhere to the panel and so prevent the operator from having a clear vision of the roadway ahead of the vehicle. The heat generated by the internal combustion engine 11 will be forced rearwardly through the heating flue 15 by the usual cooling fan, not shown, and this travel of the warm air thru the heating flue will be further aided thru forward travel of the vehicle.

A control means is provided for regulating the amount of heat passed thru the heating flue 15 and in the example shown embodies a hinged shutter 18 hingedly mounted at the forward end of the heating flue. This shutter is adapted to close the forward end of the flue 15 and is normally urged to a closed position by a suitable spring 19 which also serves as an anti-rattler means for preventing vibration of the shutter. Secured to the forward side of the shutter is an L-shaped bracket 20 to one end of which is pivotally connected a longitudinally movable control rod 21 which is extended thru the dash 13 and instrument board 14. The rear end of the rod 21 may be provided with a suitable handle or knob 22 and the rod is also provided with a suitable number of keepers 23 adapted to engage with the instrument board for retaining the shutter 18 in its adjusted position. These keepers 23 preferably engage the rear face of the instrument board and are held in engagement therewith by the tension of the spring 19.

Mounted to extend vertically along the outer edge of each pillar or corner post 7 is a heat conductor 24 which may vary in cross sectional configuration and in the example shown are of semi-circular shape providing a vertical heat duct along the outer edge of each pillar. These heat conductors are preferably closed at their upper ends and have their lower ends in communication with the heating flue 15 thru means of ducts 25 one of which opens into each side of the heating flue adjacent the ends of the slot 16. Each heat conductor 24 is provided with a vertically extending rearwardly opening slot 26 along the outer edge of which is provided a deflector 27. The deflector portions of the heat conductors are directed slightly toward the vehicle body and serve to deflect warm air escaping thru the slot 26 upon the glass panels 9 of the doors 8. Forward travel of the vehicle will also aid in directing the warm air current laterally over the glass panels 9 and keep them free from snow, sleet or ice so that the operator may have a clear vision thru both side panels 9.

By having the shutter 18 arranged at the forward end of the heating flue 15 allows for ready control of the heat directed upon the windshield panel and also the side panels 9.

Referring to the form of heater shown in Figures 4 to 9 inclusive, the same is adapted to be detachably associated with the vehicle body for directing warm air currents over the windshield panel 6 and the door panels 9. This heater B embodies an apron 30 formed of a flexible material and is adapted to be disposed over the cowl 5. The apron is preferably formed with top and bottom layers 31 and 32 respectively, the lower layer being slightly narrower than the top layer and forming a flap 33 along the entire forward edge of the apron. The ends of the apron may be of any preferred shape and each end is provided with front and rear attaching straps 34 and 35 respectively. These attaching straps 34 and 35 are preferably of an elastic nature and serve to hold the apron in a taut condition over the upper side of the cowl 5. The front tie straps 34 are preferably connected to the hood fasteners 12 while the straps 35 may be attached to the vehicle at any suitable location and in the example shown in Figure 4 have been attached to the lower hinges for the doors 8.

Arranged between the upper and lower layers 31 and 32 respectively is a series of spaced slats 38 which preferably extend in forwardly converging relation as shown in Figure 8 with the forward ends of the slats projecting beyond the forward edge of the bottom layer 32. The central slat 38′ terminates short of the rear edge of the bottom layer 32 so as to not interfere with the usual hinge connection connecting the side sections of the hood 10. The slats 38 and 38′ are secured in place by means of stitching extended along each edge of each slat. The top layer 31 is left flat while the bottom layer is looped about the slats as clearly shown in Figure 6 so that an opening 40 is formed between adjacent slats when the heater is in position over the cowl 5.

Formed at the rear edge of the apron 30 just beyond each of the end slats 38 are side deflector horns 40 of semi-circular shape in cross section for directing warm air currents upon the side panels 9. These semi-circular shaped horns 40 are preferably held in place by means of a frame 41 shown in Figure 9 embodying a semi-circular shaped end portion 42 and parallel side arms 43. When the apron is in position upon the vehicle body the arcuate ends 42 of the frames which are arranged at the ends of the horns, retain the ends of the horns open so that air current may readily pass thru the passageway formed between the horns and the cowl.

In mounting the heater B for use, the hood 10 is first slightly raised at its rear end so that the forward ends of the spacer slats 38 may be slipped beneath the rear portion of the hood. This slight raising of the rear portion of the hood forms an opening 45 along the rear upper portion of the hood forming a passageway to permit the warm air current to pass rearwardly between the slats 38. The apron is of such width as to have its rear edge disposed in slightly spaced relation forwardly of the windshield panel 6 so that the hot air current will be directed against the windshield. The flap portion 33 is extended over the upper side of the hood 10 as clearly shown in Figure 7 and serves to prevent escape of the warm air thru the space formed by slightly elevating the rear portion of the hood. The apron is drawn into contact with the cowl by the attaching straps 34 and 35 so that the spacer slats form the openings 40 thru which the warm air currents pass rearwardly and are directed upon the windshield panel. If so desired, the slats 38 and 38' may be flexible for allowing the apron to readily conform to the contour of the cowl. The heat passing along the outer side of each of the end spacer slats will be directed into the semicircular shaped deflector horns 40 and be directed against the side panels 9.

Thus it will be seen that in each form of heater that an arrangement has been provided whereby the heat from the engine is not only directed upon the windshield panel but also upon the glass panels of the side doors.

Changes in detail may be made to the forms of invention herein shown and described, without departing from the spirit of the invention or the scope of the following claims.

We claim:

1. The combination with a motor vehicle including windshield and side panels, and an engine; heater means embodying a conductor for conveying hot air from the engine and directing the air upwardly over the face side of the windshield, and means communicating with the conductor for directing some of the hot air rearwardly over the side panels.

2. The combination with a motor vehicle including a windshield panel, side panels, an engine, and a cowl, said cowl having an elongated slot formed therein just forwardly of the lower end of the windshield, of a heater comprising a heating flue for directing hot air from the engine upwardly thru said slot, and vertically disposed heat conductors at the forward end of each side panel in communication with the heating flue, said heat conductors being open for directing air currents rearwardly over the side panels.

3. The combination with a motor vehicle including a windshield, transparent side door panels, an engine, and a cowl between the engine and windshield and being slotted across its rear portion, of a substantially flat heating flue arranged beneath the cowl for directing hot air from the engine upwardly thru said slot and against the windshield, a heat conductor arranged vertically at each end of the windshield for directing hot air rearwardly over the side panels, and ducts arranged beneath the cowl for connecting the lower end of each heat conductor with the heating flue.

4. The combination with a motor vehicle including a windshield, transparent side door panels, an engine, and a cowl between the engine and windshield and being slotted across its rear portion, of a substantially flat heating flue arranged beneath the cowl for directing hot air from the engine upwardly thru said slot and against the windshield, a heat conductor arranged vertically at each end of the windshield for directing hot air rearwardly over the side panels, a duct connecting the lower end of each heat conductor with the heating flue, and control means for regulating the passage of hot air thru the heating flue.

5. The combination with a motor vehicle including a windshield, transparent side door panels, an engine, and a cowl between the engine and windshield and being slotted across its rear portion, of a substantially flat heating flue arranged beneath the cowl for directing hot air from the engine upwardly thru said slot and against the windshield, a heat conductor arranged vertically at each end of the windshield for directing hot air rearwardly over the side panels, a duct connecting the lower end of each heat conductor with the heating flue, and control means for regulating the passage of hot air thru the heating flue including a hinged flap for closing the forward end of the flue, spring means normally urging the flap to a closed position, a control rod pivotally connected at one end to the flap, and means for retaining the rod in adjusted position against the action of said spring.

6. The combination with a motor vehicle including a windshield, transparent side panels, an engine and a cowl between the engine and windshield and having a slot extending across its rear portion, of a heating flue arranged beneath the cowl for directing hot air from the engine upwardly thru said slot, a deflector strip secured to the cowl along the forward edge of said slot for directing the hot air rearwardly and upwardly against the windshield, a heat conductor arranged vertically at each end of the windshield and each being slotted for directing hot air rearwardly over the side panels, and a duct connecting the lower end of each heat conductor with opposite sides of the heating flue.

7. A heater for the windshield and side panels of a motor vehicle comprising a flexible cover member for positioning over the cowl of the vehicle with its rear edge spaced from the windshield, means for attaching the cover member at its ends to the vehicle, spacer slats secured to the under side of the cover member to form passageways between the cover and cowl, said slats having their forward ends adapted to project beneath the engine hood for elevating the hood at its rear portion, and heat deflecting horns projecting rearwardly from the cover body for directing a portion of the hot air against the side panels.

8. A heater of the class described comprising an elongated flexible body of sheet material embodying connected top and bottom layers, said bottom layer being of less width than the top layer and forming a flap along the forward edge of the flexible body, attaching straps at each end of the body for securing the heater in position over the cowl of a motor vehicle forwardly of the windshield, and spacer slats secured transversely of the body between the layers with the forward ends of the slats extended beyond the forward edge of the bottom layer for positioning beneath the rear end of the vehicle hood.

9. A heater of the class described comprising an elongated flexible body of sheet material embodying connected top and bottom layers, said bottom layer being of less width than the top layer and forming a flap along the forward edge of the flexible body, attaching straps at each end of the body for securing the heater in position over the cowl of a motor vehicle forwardly of the windshield, spacer slats secured transversely of the body beneath the top layer with their forward ends extending beyond the forward edge of the bottom layer, and a semi-circular shaped horn extending rearwardly from the body beyond each end slat.

XANDER Y. ZUHLKE.
ROLLIN B. JORDAN.